United States Patent [19]

Davis et al.

[11] 4,410,890

[45] Oct. 18, 1983

[54] VHF DIRECTIONAL RECEIVER

[75] Inventors: Stevan A. Davis, Powder Springs; Arthur Luedtke, Marietta, both of Ga.

[73] Assignee: The United States of America as represented by the Field Operations Bureau of the FCC, Washington, D.C.

[21] Appl. No.: 260,867

[22] Filed: May 6, 1981

[51] Int. Cl.³ ............................................. G01S 5/02
[52] U.S. Cl. .................................. 343/419; 343/767; 455/269; 455/351
[58] Field of Search ............ 343/115, 113 PT, 113 R, 343/702, 767; 181/22; 455/351, 269

[56] References Cited

U.S. PATENT DOCUMENTS

| | | | |
|---|---|---|---|
| 2,555,443 | 6/1951 | Harvey | 343/767 X |
| 2,573,438 | 10/1951 | Hathaway et al. | 181/22 X |
| 3,018,369 | 1/1962 | Holmes | 343/113 R |
| 3,094,663 | 6/1963 | Siegel | 343/767 X |
| 3,115,635 | 12/1963 | Leeming et al. | 343/113 R |
| 3,323,129 | 5/1967 | Held | 343/115 |
| 3,683,384 | 8/1972 | Warren | 343/113 PT |
| 3,965,425 | 6/1976 | Peterson et al., | 343/113 PT X |
| 4,003,060 | 1/1977 | Broce et al. | 343/113 PT |
| 4,263,597 | 4/1981 | Bentley et al. | 343/121 |

Primary Examiner—Maynard R. Wilbur
Assistant Examiner—Robert C. Burk
Attorney, Agent, or Firm—Wm. Ferrel Bentley

[57] ABSTRACT

A miniature handheld receiver contained in a metal shielding enclosure incorporating a slot type directional antenna as a part of the structure such that when the antenna is aligned with a radio frequency signal of interest, a null is produced in the signal level. The antenna is coupled to receiver circuitry which includes an oscillator used to FM modulate the signal by tone injection when an unmodulated carrier is present, an FM detector for demodulating the RF signal, an audio amplifier for amplifying the demodulated audio and an acoustically coupled earphone to prevent stray RF pickup from the earphone cord.

2 Claims, 4 Drawing Figures

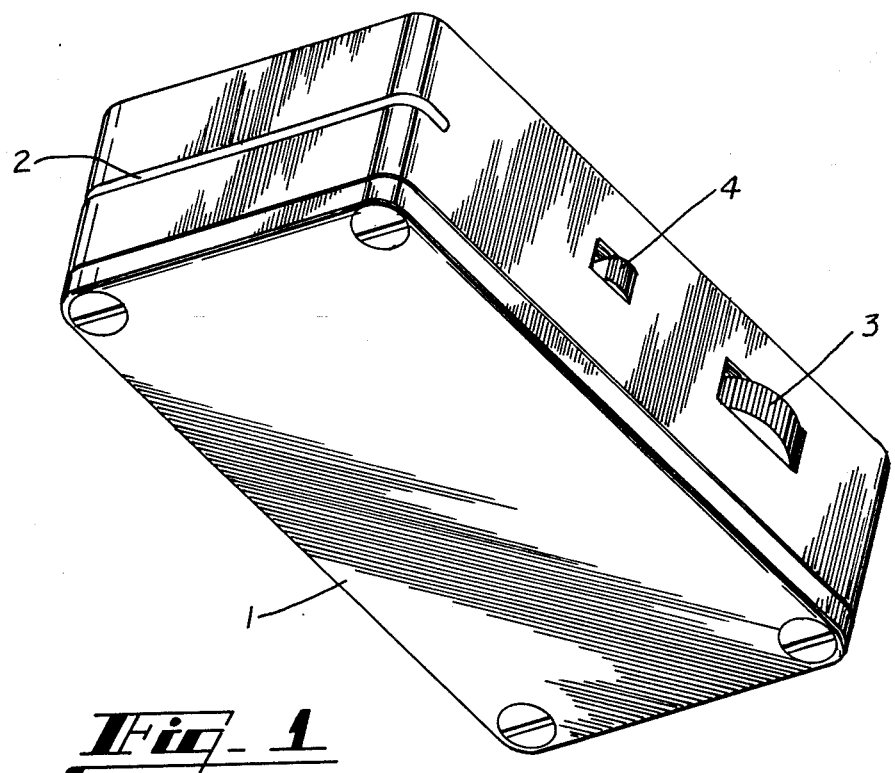
Fig_1
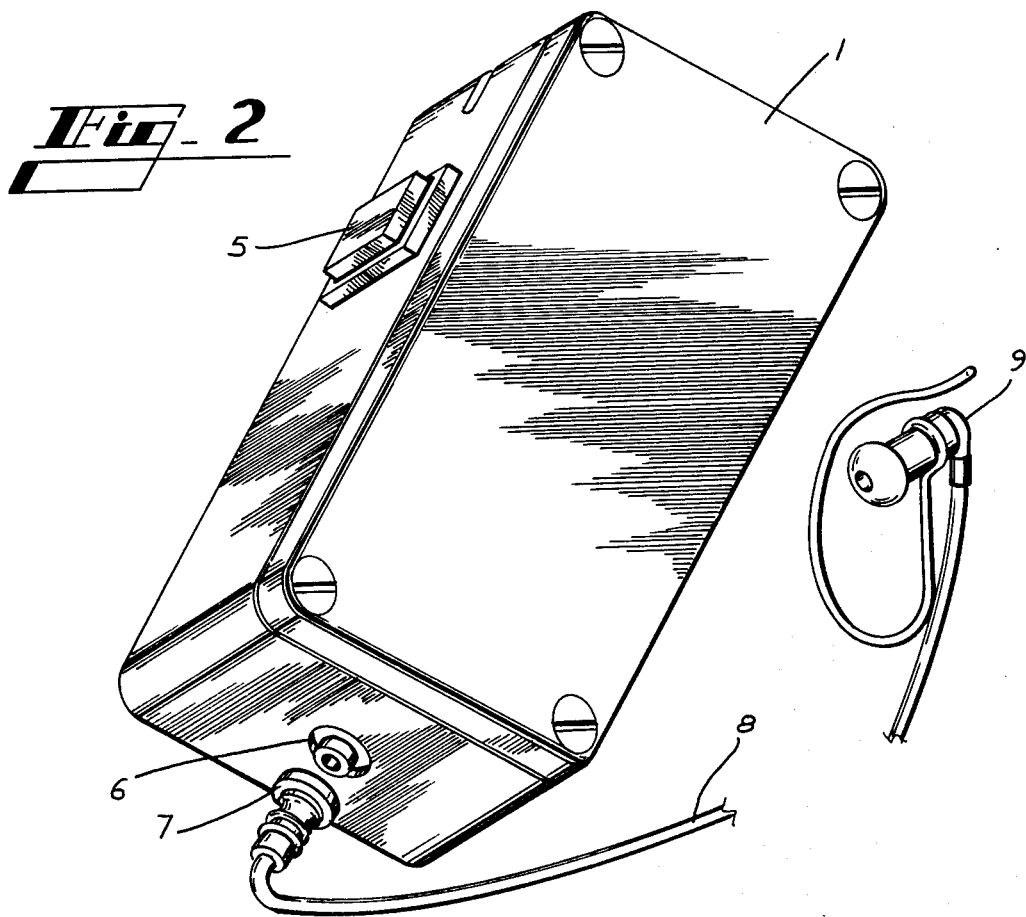
Fig_2

VHF DIRECTIONAL RECEIVER

CROSS REFERENCES TO RELATED APPLICATIONS

Related U.S. Pat. No. 4,003,060 pertains to similar device capable only of operation on frequencies below 50 MHz. U.S. Pat. No. 4,263,597 pertains to the type of mobile direction finders normally used in conjunction with this invention.

BACKGROUND OF THE INVENTION

1. Field of the Invention

The present invention relates to a directional receiver contained in a handheld portable housing that is useful at VHF frequencies and on FM modulated signals. This invention is intended primarily for use above 100 MHz and is relatively insensitive so that it can be used close to the transmitting antenna without overloading. It would normally be used within sight of the transmitting antenna to determine precisely where or which is the antenna in use.

2. Description of the Prior Art

In the field of portable directional receivers, it has been the general practice in the art to employ a ferrite rod loopstick antenna to find the RF signal source by rotating the antenna until a null is obtained in the signal level. Such receivers are not effective above approximately 50 MHz and have been capable only of detection of Amplitude Modulated signals.

Specifically, Warren, U.S. Pat. No. 3,683,384, utilizes the typical loopstick and limits his demodulation capability by incorporating a frequency filter that would disrupt any intelligence on the signal, passing only the 1020 Hertz tone present on the radio beacons in the 300 kHz region of the spectrum. Leeming, U.S. Pat. No. 3,115,635 and Held, U.S. Pat. No. 3,323,129 likewise utilize the typical loopstick with its frequency limitations and a detector for AM demodulation only.

The closest device in the field of direction finding to this invention is the Leigh DRF-2. Although this device will DF in the VHF frequency range there are several major differences. The DRF-2 was intended as a receiver to be used with a transmitter emitting a continuous low power signal on a specific frequency. Specifically, it was intended to locate downed aircraft by finding the crash activated ELT (Emergency Locating Transmitter) required on all FAA approved aircraft. The Leigh utilizes two vertical antennas approximately 12 inches in height that extend from the top of the receiver to make an overall height approaching 20 inches. This invention on the other hand, is only 4½ inches high including the complete receiver, battery pack, and antenna and will fit comfortably in a coat pocket. The Leigh device is designed to be able to receive a one-half watt signal at a range of several miles and not overload at close range only on a signal of this low power. This invention is designed to receive a one watt signal no further away than a few hundred feet and will not overload on a twenty-five watt signal even when ten feet away. The Leigh device is also limited to AM demodulation and could not be utilized discreetly in a crowded environment.

SUMMARY OF THE INVENTION

The object of this invention is to provide a directional receiver contained in a handheld portable housing for locating nearby RF signal sources having all the advantages of similarly employed prior art directional receivers and none of the disadvantages. This handheld unit will normally be used with some sort of VHF mobile DF system. The mobile unit will locate the signal to a small area where this invention may be used to locate the specific transmitting antenna. The reception range of the invention is about one-half mile for a twenty-five watt signal.

An object of this invention is to have low sensitivity with a vertically polarized pick up pattern. This is accomplished by the use of a slot antenna which has a very short effective height and is shielded to prevent RF leakage from obscuring the antenna null. Another object of this invention is to provide a directional receiver that can be operated in a public area without attracting a great deal of attention. This aspect is particularly desirable when attempting to locate uncooperative transmitters controlled by persons who are operating in such a manner as to disrupt the communications of others. This invention provides for this use by incorporating the complete receiver, battery pack and antenna all in a package only four and a half inches by two and a half inches by one and one quarter inches. An earpiece is utilized to prevent the receive audio from being heard by anyone other than the operator. Still another object of this invention is to allow the use of an earphone in the presence of RF fields without disturbing the bearings; earphone cord pickup can obscure an antenna null at VHF frequencies using prior art techniques. This invention solves that problem through the use of an acoustic earpiece coupled to the receiver with a plastic tube. A further object is to provide the capability to hear an aural null when attempting to locate unmodulated signals. This invention incorporates an integral tone oscillator to artificially induce FM deviation on an otherwise unmodulated signal such that a tone will be present relative to signal strength. Another object of this invention is to provide for the proper detection of intelligence in the form of FM modulation on the VHF signals of interest.

BRIEF DESCRIPTION OF THE DRAWINGS

The invention will be readily understood in light of the description of the illustrative embodiment of the present invention which follows. In the drawings which form part of the disclosure, like reference numerals refer to like elements.

FIG. 1 illustrates the top perspective view of the invention,

FIG. 2 illustrates the bottom perspective view of the invention,

DESCRIPTION OF THE PREFERRED EMBODIMENT

Figure 3:
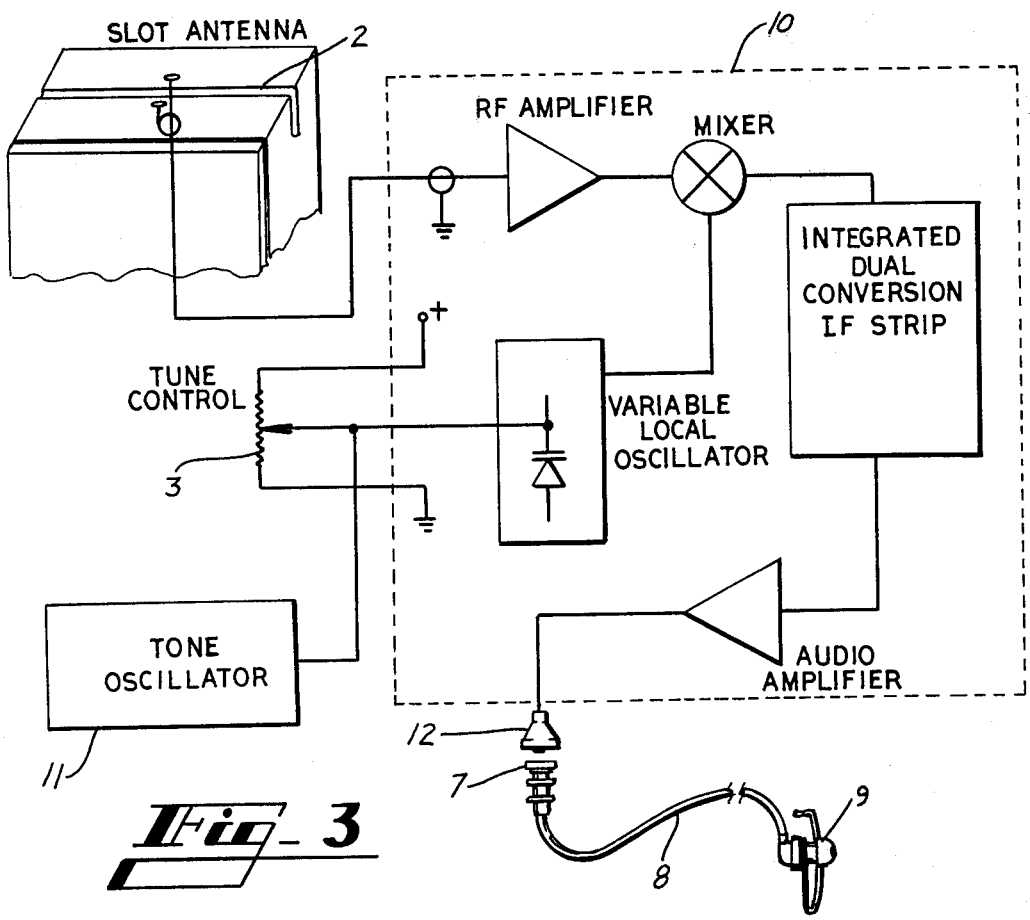
FIG. 3 illustrates the perferred embodiment of the invention.

In FIG. 1, the top perspective view, the enclosure 1 is a metal housing which forms an electrostatic shield around the circuitry preventing stray pick up. This shielding is important because the critical area of interest with this type of DF receiver is the null of the antenna pattern, FIG. 4. If the receiver is not adequately protected, stray pickup will allow the signal to be heard even as the antenna null 14 comes in line with the radiating source. Under proper operation, as the null aligns with the source of the signal, the signal level will drop to near zero. In FIG. 1, the slot antenna 2 is machined into the case 1 utilizing the body of the case as the ground plane against which the null pattern is generated. The case also serves to provide a cavity below the slot to minimize the theoretical bottom half of the figure-eight pattern 13 in FIG. 4, and to lower the effective radiation angle of the antenna. The slot antenna 2 in FIG. 4 in this embodiment is non-resonant and has an effective height of less than 0.1 wavelength, whereas a normal slot in the classic sense would be a full half wavelength long and resonant at the frequency of interest. The small size of this antenna 2 limits the useful range to about one-half mile to decrease the probability of receiving more than one signal on any given frequency. The slot type of antenna is also particularly sensitive to vertically polarized radiation which characterizes the vast majority of signals in the VHF region. The tuning knob 3 controls the voltage on a variable capacitance diode in the variable local oscillator (LO) in the receiver 10 (FIG. 3). Movement of the knob changes the frequency of the LO and consequently the received frequency.

The tone oscillator switch 4 in FIG. 1 switches power to the tone oscillator 11 in FIG. 3. The output of that oscillator 11 is AC coupled to the same variable capacitance diode as the turning knob and when turned on, FM modulates the LO around the frequency set by the turning control 3 in FIG. 1. As in any typical receiver the local oscillator mixes with the incoming signal to produce an intermediate frequency (IF). If the incoming signal is unmodulated, it normally could not be detected in the FM discriminator; however, in this case, since the LO is FM modulated, a tone is still produced on the IF just as if the incoming received signal had been FM modulated with that tone. This allows the normal FM demodulation circuitry to produce an audible tone relative to signal strength for a carrier that otherwise could not be heard. An obvious extension of this configuration would be to couple the tone oscillator 11 in such a manner as to cause AM modulation on the LO after which the IF could then be detected with normal AM detection schemes.

FIG. 2 shows a bottom perspective view of the preferred embodiment. The on/off switch 5 is located on the side opposite the tone and tune controls and is designed to fall approximately under the index finger of the hand operating this invention. The switch is a momentary push on type of switch which reverts to the off position when released. Located at the bottom center of the case 1 is a hole 6 through which the audio line connector 7 attaches to the speaker 12 as shown in FIG. 3. The connector 7 is attached to the non-metallic hollow tube 8 which is in turn attached to the earpiece 9 which fits into the ear.

FIG. 3 depicts an overall layout of this invention, consisting particularly of the slot antenna 2 feeding a conventional FM VHF receiver 10 incorporating integrated and discrete devices optimized for minimum current consumption and adapted to detect unmodulated signals by the tone oscillator 11 and feeding a 1000 ohm earphone type speaker 12 which is acoustically coupled to the ear through use of the hollow tube 8 and earpiece 9. This non disruptive type of acoustic coupling to the ear is necessary at VHF to avoid severe distortion of the RF field caused by the presence of conducting lines in the vicinity of the receiving antenna. Previous efforts to eliminate field distortion caused by conducting audio lines have been relatively ineffective because of the need to isolate the line into short sections whose effective height is low enough so as to not cause noticable disturbance. An additional problem with conducting audio lines is isolating the line adequately to protect the 60 dB antenna null from being obscured by stray pickup entering through the earphone cord. Both of these problems are completely eliminated by utilizing this acoustic coupling through a non-metallic hollow tube to the ear.

Figure 4:
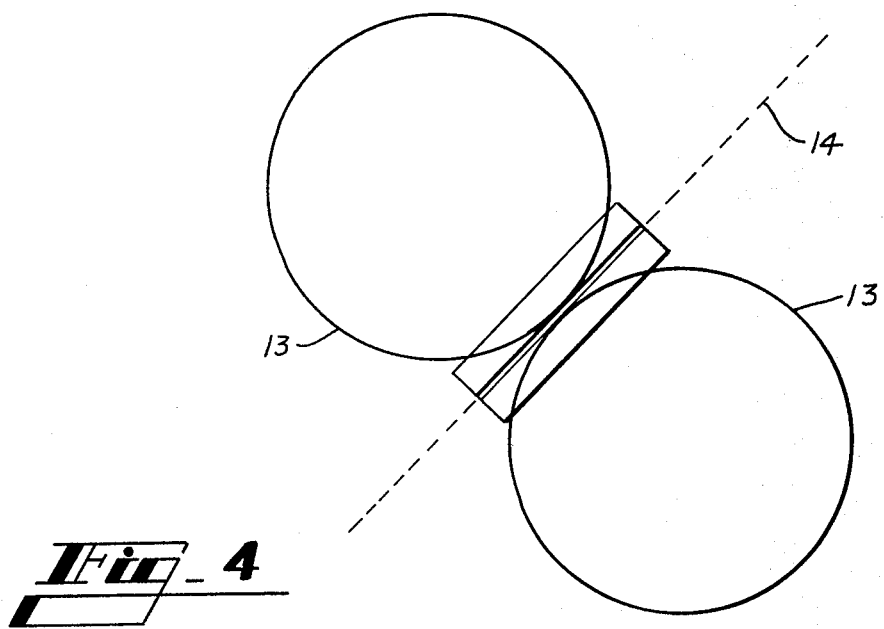
FIG. 4 illustrates the RF receiving pattern of the invention.

FIG. 4 shows the orientation of the figure-eight receiving pattern of the slot antenna 2. The received signal will be greatest when the source is at right angles to the slot antenna and conversely, the signal null 14 will occur when the source is in line with the slot. The addition to the normal bidirectional information available from other portable DF receivers, the small size of this invention allows it to be used to provide sense indication by using the human body to block one of the figure-eight lobes shown in FIG. 4. Holding this invention with the slot parallel with and close to the chest will allow the body to block the RF signal available from behind and thereby create a single lobe pattern. By turning around and stopping when the signal is at its peak the operator will be facing in the direction of the signal source. Then the receiver may be rotated to the normal null position to sight down the slot and listen for the null for a more accurate bearing.

Various modifications are contemplated and may obviously be resorted to by those skilled in the art without departing from the spirit and scope of the invention as hereinafter defined by the appended claims as only a preferred embodiment thereof has been disclosed.

What is claimed and desired to be secured by Letters of Patents of the United States is:

1. A small handheld directional receiver particularly suited for use by operators in public areas for covert location of radiation sources at VHF frequencies consisting of: an integral directional nonresonant slot antenna with very short effective height connected to FM receiving circuitry completely shielded by a metal housing, said receiving circuitry having a selectable modulation means for adding FM Modulation to unmodulated received signals, with audio output being proportional to the strength of a received signal and coupled to said operator's ear through a non-metallic means.

2. The directional receiver of claim 1 wherein said modulation means consists of an audio oscillator coupled to local oscillator of said receiver in such a manner as to cause a small symmetrical shift in the local oscillator frequency at an audio frequency rate.

* * * * *